L. W. RITTENHOUSE.
SNOWPLOW.
APPLICATION FILED NOV. 12, 1920.
1,406,897.
Patented Feb. 14, 1922.
2 SHEETS—SHEET 2.
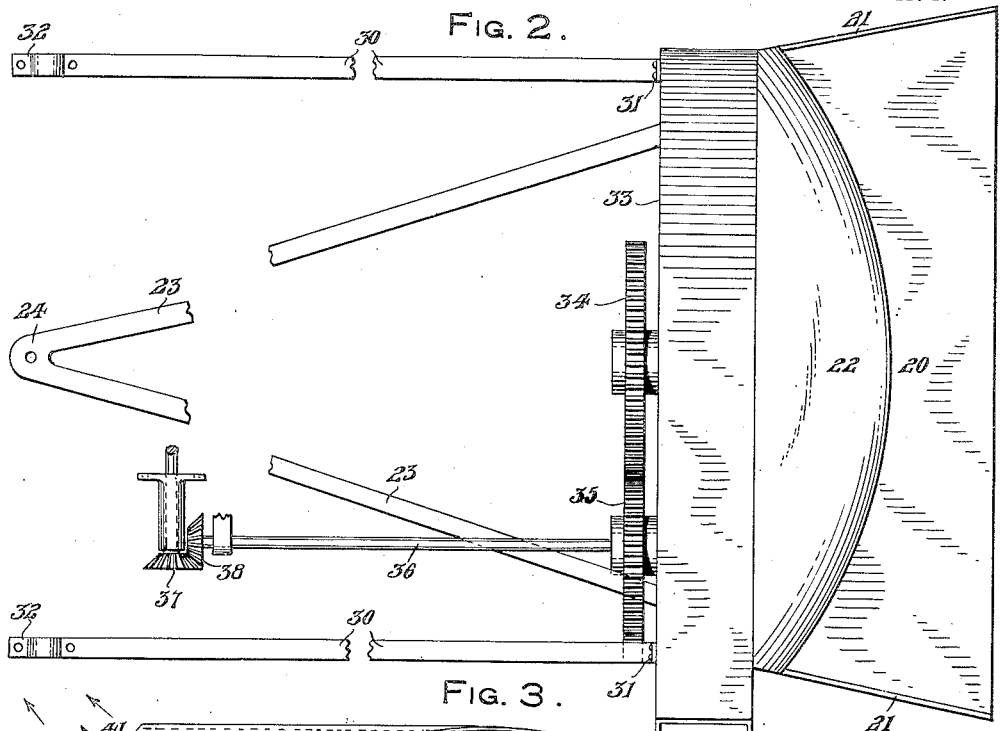
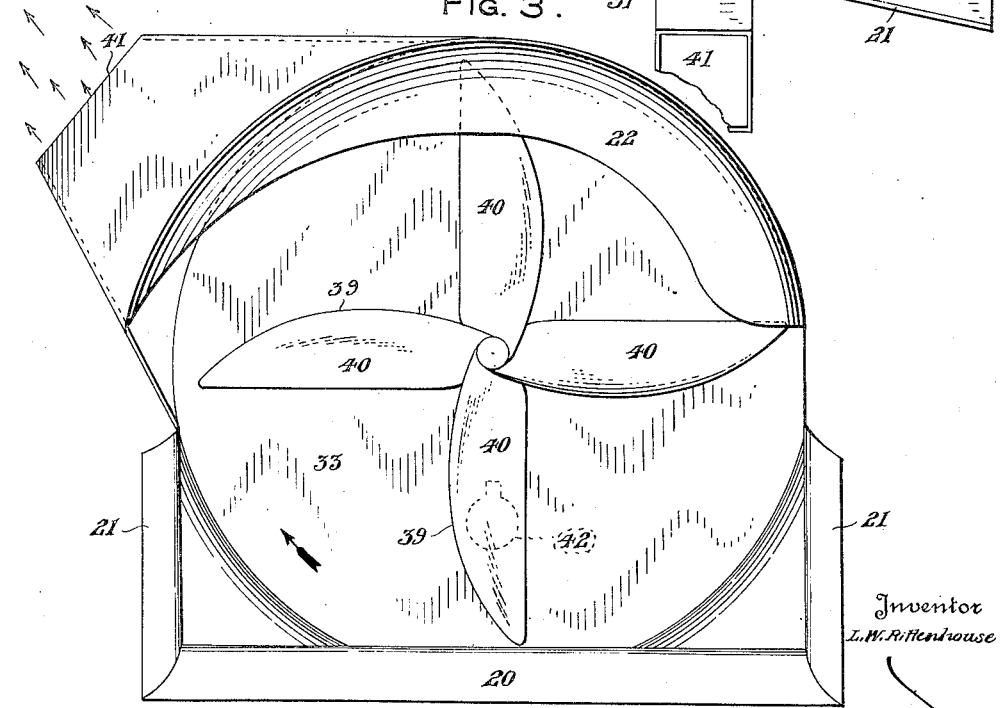
Inventor
L. W. Rittenhouse
By F. K. Bryant
Attorney

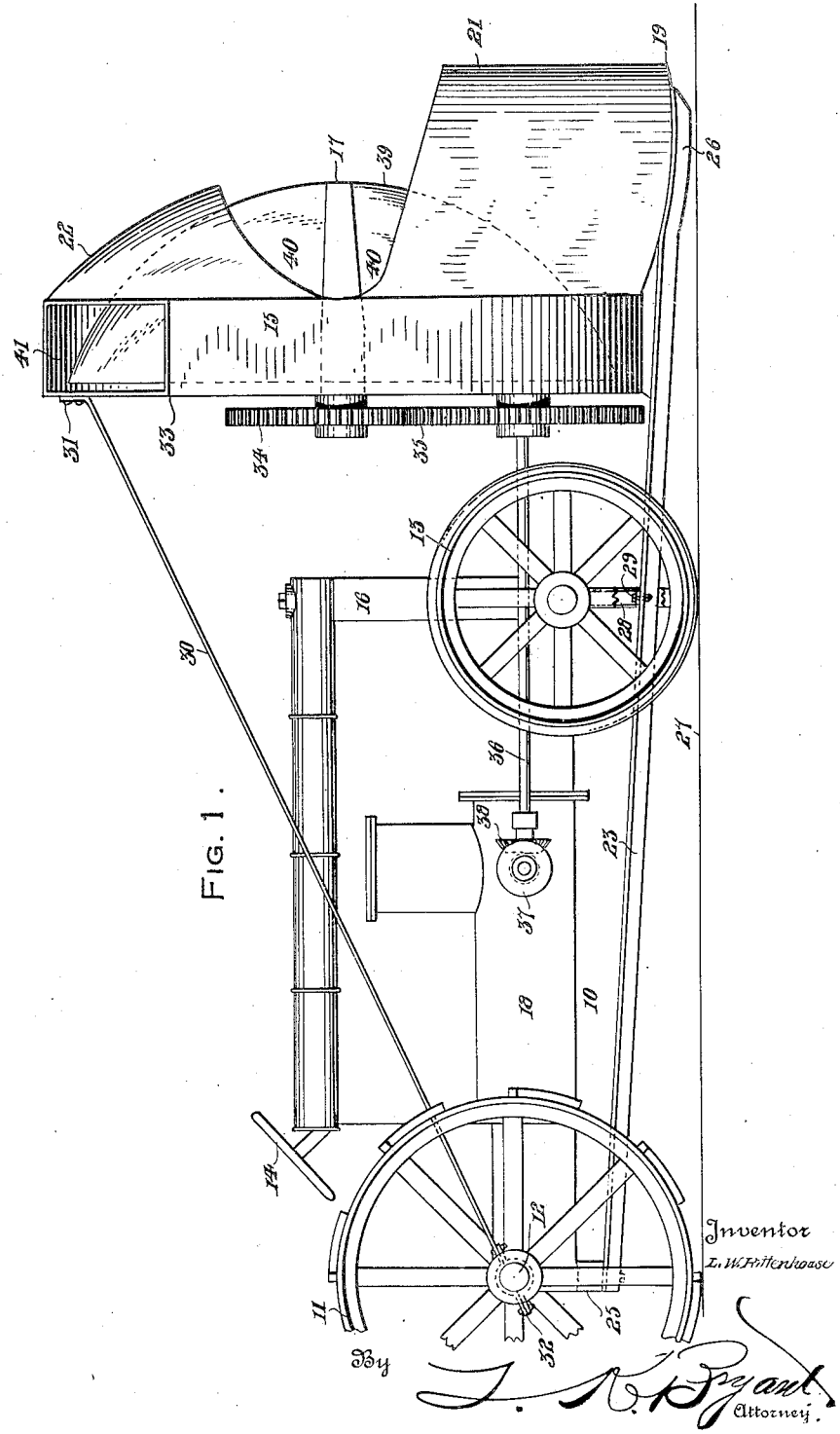

UNITED STATES PATENT OFFICE.

LEON W. RITTENHOUSE, OF ROCHESTER, NEW YORK.

SNOWPLOW.

1,406,897.  Specification of Letters Patent.  Patented Feb. 14, 1922.

Application filed November 12, 1920. Serial No. 423,581.

*To all whom it may concern:*

Be it known that I, LEON W. RITTENHOUSE, a citizen of the United States of America, residing at Rochester, in the county of Monroe and State of New York, have invented certain new and useful Improvements in Snowplows, of which the following is a specification.

The primary object of the invention is the provision of a snow plow attachment for trucks and vehicles and is especially designed for use upon a Fordson or similar tractor whereby snow can be easily and quickly removed from the roadway during travel thereover.

A further object of the invention is the provision of a snow plow adapted for ready attachment forwardly of a tractor for use in removing snow from the roadway, the construction being such as not to interfere with the usual operation of the tractor and being easy and inexpensive to manufacture.

A still further object of the invention is to provide a snow plow adapted for removable attachment forwardly of a Fordson tractor, suitable connection being provided between the plow and the rear portion of the tractor such as axle housings for imparting great pushing power to the plow during the operation of the device.

My plow attachments permits the free steering of the tractor by the front wheels thereof and the same freedom of movement as when the attachment is not used, it being designed to deposit the snow at only one side of the roadway by the action of blades cutting and throwing the snow in a predetermined path.

With these general objects in view, the invention consists of the novel combination and arrangement of parts hereinafter more fully described, illustrated in the accompanying drawings and pointed out in the claims.

In the drawings, like references designate corresponding parts throughout the several views, and Figure 1 is a side elevational view of a tractor provided with my invention, Figure 2 is a top plan view of the device removed from the tractor and with parts broken away, and Figure 3 is a front elevation of the device.

Referring more in detail to the drawings, a farm tractor 10 is herein illustrated of the general form known to the trade as the Fordson tractor having rear traction wheels 11 upon the rear axle 12 and forward wheels 13 employed for steering by means of the steering wheel 14.

The plow broadly consists of a substantially cylindrical housing 15 mounted forwardly of the front wheels 13 and the radiator 16 of the tractor, a bladed rotor or cutter 17 being journaled in and projecting from the forward side of the housing 15 and adapted for operation by the motor 18 of the tractor. A showel 19 forwardly projects from the lower portion of the housing 15 including a beam plate 20 and side wings 21, while an arcuate hood 22 carried by the upper portion of the housing 15 depends overlying and spaced from the rotating cutter 17.

Push bars 23 preferably connected together adjacent their rear ends 24 in V-shaped arrangement, are rearwardly secured to the draw bar or other convenient portion 25 of the frame of the tractor 10 at a point adjacent the rear axle 12. The forward end portions 26 of the push bars 23 support the housing 15, being attached to said housing as well as the shaft 20 so that the latter is operatively positioned slightly above the level of the roadway such as 27. A depending brace 28 adjacent the forward portion of the tractor 10 has its opposite ends secured as at 29 to the push bars 23, it being understood that sufficient clearance is provided between the bars 23 and the wheels 13 so as not to interfere with the steering of the tractor. Braces 30 are attached as at 31 adjacent the top of the housing 15 with their rear ends secured to the rear axle housing of the tractor 10 as at 32.

The cutter 17 is centrally journaled through the rear wall 33 of the housing 15 and provided with a gear 34 in mesh with a similar gear 35 having its shaft 36 operatively engaged with a power pinion 37 of the motor 18 by means of a pinion 38 upon said shaft 36. The manner of attaching my device to the tractor 10 having been described, the complete operation of the invention will be readily apparent from the drawings, it being seen that the forward travel of the tractor forces the shaft 19 into the snow and ice which is cut and pulverized by the forward arcuate edges 39 of the plurality of blades 40 of the cutter 17 revolving in the direction indicated by the arrow in Fig. 3 of the drawings. This operation sweeps the snow and ice as well as drawing the same by suction upwardly and outwardly through a side exit or spout 41 adjacent the top and at one side of the housing 15, the hood 22 preventing the forward escape of snow insuring the same being exhausted through said spout 41. The push bars 23 possess great strength being preferably of angle iron formation rigidly carried by the draw bar 25 and brace 28 whereby the pushing power of the tractor is exerted upon the housing 15 and shaft 19 from a point adjacent the traction axle 12 of the tractor 10. It will be understood that the pinions and gears may be suitably encased as desired while an opening such as 42 may be provided in the housing wall 33 to accommodate the starting crank of the motor 18 if desired. The cutting blades 40 are arcuate in cross section and not only cut the snow by means of their forward edges 39, but also draw the snow rearwardly into the housing 15 by suction and throw the snow outwardly through the spout 41 during the operation of the plow. A strong and serviceable snow plow attachment is provided readily installed upon and removed from a tractor at will and one which will not detract from the operation of the tractor while in use. The form of the invention herein set forth and described in its simple construction is considered the preferred embodiment of the invention, but it will be understood that minor changes may be made in the form, proportion and size of the various parts as well as the usual details of construction without in any manner departing from the spirit and scope of my invention.

What is claimed as new is:—

1. An attachment for a tractor having a motor and a frame, a snow receiving member, push bars upon which said receiving member is mounted forwardly of the tractor with the rear ends of the bars attached adjacent the rear end of the tractor, and a cutter within the receiving member operatively connected to the motor of the tractor when the device is assembled for use.

2. In combination with a tractor having a frame and a motor, V-shaped push bars beneath the frame projecting forwardly thereof with the rear ends of the bars connected together and rigidly attached adjacent the rear end of the frame, a depending support adjacent the forward end of the frame attached to said bars, a housing upon said bars forwardly of the tractor, and a cutter carried by the housing operatively connected to the motor of the tractor.

3. A snow plow attachment for motor tractors comprising snow gathering means positioned forwardly of the tractor, brace rods secured to the upper and lower edges of the gathering means and converging rearwardly for attachment to the tractor adjacent the rear end thereof, and a bracing connection between the forward end of the tractor and the lower brace rods.

In testimony whereof I affix my signature.

LEON W. RITTENHOUSE.